Sept. 15, 1942.　　L. E. CRANE ET AL　　2,295,937
SCREEN SEPARATOR
Filed Dec. 5, 1939
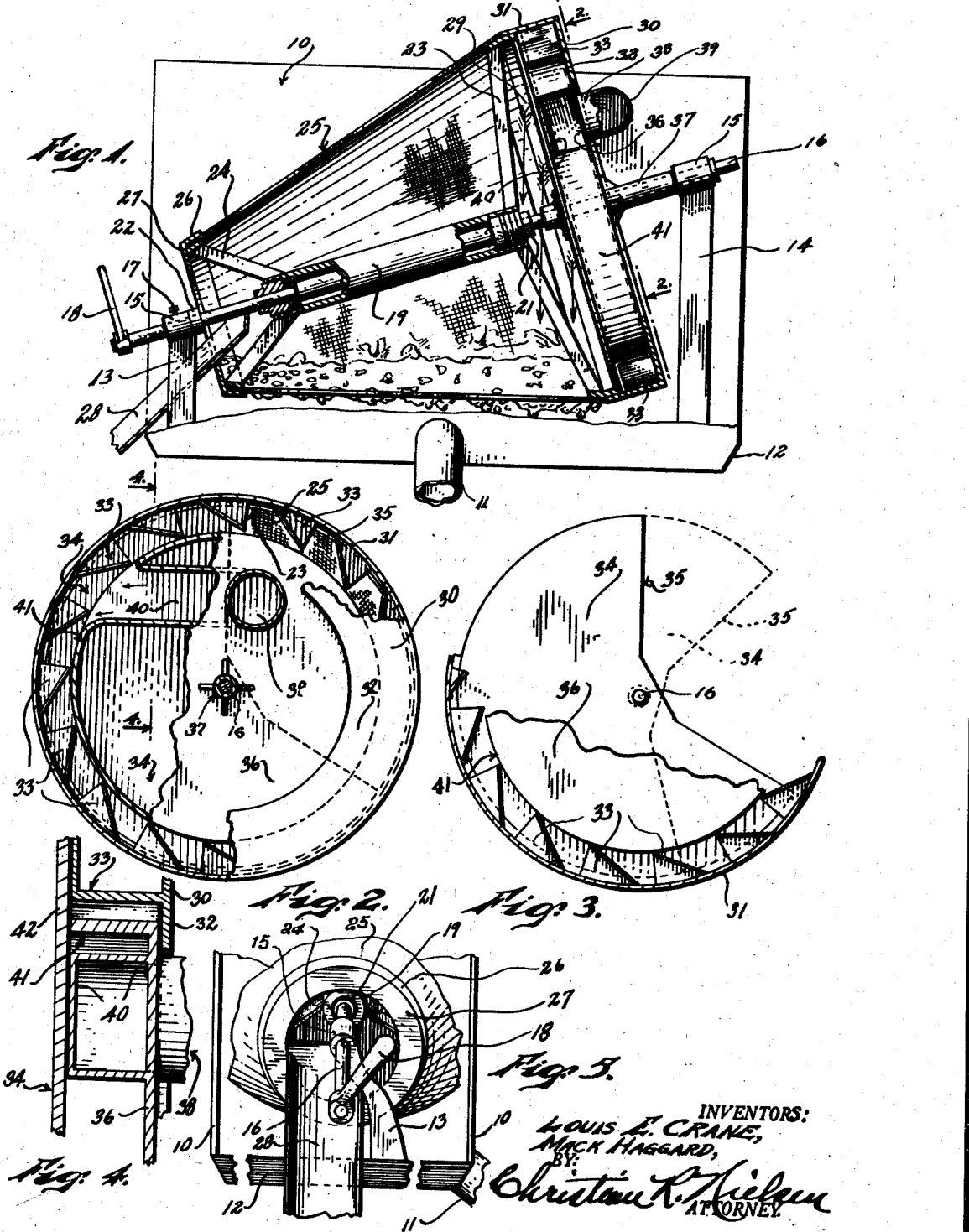

Patented Sept. 15, 1942

2,295,937

UNITED STATES PATENT OFFICE 2,295,937

SCREEN SEPARATOR

Louis E. Crane and Mack Haggard, Hobbs, N. Mex.

Application December 5, 1939, Serial No. 307,712

3 Claims. (Cl. 210—199)

The invention relates to separators of the rotary screen type, and has for an object to provide a device of this kind having novel functions and results of importance in various situations where a fluid mass including a fluid material including aggregates of dissimilar materials to be separated from the fluid medium, and particularly those in which the fluid action is utilized as a means of suspension of the aggregates to be removed. It will be understood, however, that the invention is also of utility in other situations, as will be appreciated.

The invention has particular utility in the drilling of wells, and particularly deep wells, especially where a method is followed as in the drilling of wells for petroleum, in the operation commonly designated as "drilling of oil wells."

In such drilling operations, it is a common practice to maintain around the bit a mixture of water and clay, or a mixture of water and some other material adapted to give it somewhat greater viscosity, or affect the specific gravity of the fluid so formed, so that in the drilling operation, the material loosened by the bit will become suspended in the first named medium and enable its more ready removal, either by pumping or by bailing operation. In many situations there is a scarcity of water in the strata through which the wells are drilled, and it is a practice to introduce a sufficient amount of water to form in the well the desired heavy fluid mass, either by the pulverization of materials through which the well is sunk, incident to the operation of the drill bit, or by the introduction of a certain amount of clay and water mixture, and when this fluid is lifted from the well containing detritus loosened from the drill, the suspension fluid is separated and returned to the well for further use, economizing the supply of water it is necessary to introduce. My invention is especially useful in such separation and conservation of the suspension fluid.

It is a special object of the invention to present a device which will permit the passage of the mass including the aggregate into a separating device, and to present a novel construction in such a separating device adapted to attain not only the screening of the mass, but to effect novel functions in other respects, particularly with reference to the progression of the fluid and aggregate through a rotating cylindrical or conical screen, and to a means for rotating such a screen in proper relation to the rate of admission of the material to be screened, and to the consistency of the suspension fluid.

It is an important aim of the invention to provide a novel means for controlling the operation of the rotary screen so that its speed will be proper for the most effectively separation of the material introduced into the screen, with a minimum of driving or other operative connections.

Additional objects, advantages and features of invention will reside in the construction, arrangement and combination of parts involved in the embodiment of the invention, as will be understood from the following description and accompanying drawing, wherein Figure 1 is a longitudinal sectional view of a machine constructed in accordance with my invention.

Figure 2 is a section on the line 2—2 of Figure 1, looking in the direction of the arrow, Figure 3 is a view in the same direction with parts broken away to show the speed regulating gate disc.

Figure 4 is a fragmentary cross section on the line 4—4 of Figure 2.

Figure 5 is a fragmentary elevation from the left of Figure 1.

There is illustrated a device to which mud or other mixtures may be supplied from a pump or hopper, and in the present instance consisting of housing or partial enclosure 10, which may be open at the top and ends, and permits a drain pipe 11 to be led as desired. The lower part of the device is constructed as a pan or trough, adapted to hold a substantial body of the liquids separated from the materials supplied to the device, as indicated at 12. At one end of the pan, a low bracket 13 is provided, while at the opposite end a high bracket 14 is erected, these supporting at their uppermost parts for occasional rotation, an inclined shaft 16 secured in the lower boxing 15 by means of a set screw 17. The shaft is provided with a handle lever 18 at its lower end, by which it may be rotated in the boxing 15, by loosening of the screw 17, when necessary.

A pipe or other cylindrical tube 19 is mounted revolubly on this shaft, by means of anti-friction bearings 20, set a distance inward of the ends of the tube, and confined and enclosed therein by means of closure plugs 21, screwed into respective ends of the tube and engaged revolubly around the shaft 16. A collar 22 is fixed on the shaft 16 and set against the boxing of the lower bracket to hold the shaft against downward movement on its axis, slidably in the boxing.

It should be noted that the lower end of the tube 19 and its plug 21 are spaced a substantial distance from the lower bracket 13 supporting the shaft 16. Fixed on the tube 19 at respective ends, there is an upper large spider wheel 23, and a lower spider wheel 24 of much less rim diameter, the spokes of which are considerably inclined, so that the plane of the rim of this wheel is located close to the bracket 13, notwithstanding that the points of attachment of the spokes to the tube 19 are a considerable distance longitudinally from this plane. Constructed and mounted on the rims of these spider wheels, in conformity with accepted or approved practices in the construction of rotating cylindrical and similar screens, there is a body of screen material 25, forming a frusto conical screen body, the large base of which is carried upon the rim of the wheel 23, and the small portion of which is carried upon the rim of the wheel 24. In the present instance, there is engaged over the screen material a flange element 26 conforming to the general shape of the screen and serving to clamp the screen material against the rim of the wheel 24, and from this there is projected inwardly at the end of the screen a flange 27 in a plane at right angles to the shaft 16 and serving as a dam, preventing material on the screen from escaping at the lower side of the screen. That is to say, this flange prevents material from moving longitudinally outward from the screen at the lower side thereof. A discharge chute 28 is mounted, having an upper end portion extended into the open lower end of the screen, and inclined downwardly therefrom, and being located close to the flange 27, especially at the ascending side.

The rim 29 of the large spider wheel is extended a distance to the right beyond the attached edge portion of the screen, in substantially cylindrical form, and to this there is attached an annular bucket ring 30, consisting of a cylindrical portion 31 concentric with the shaft 16 and having an inner edge portion lapped over the rim 29 and secured thereto, as by welding or otherwise, and an integral planiform inwardly projected flange 32 at the right or upper side thereof. Formed in the angle of the inner side of the ring 30 thus presented, there is a series of buckets or cups 33, which may be of any desired shape and may even consist of vane-like devices, in the present instance being shown as having enlarged mouths and presented in one direction, so that they may hold liquids while descending at the left hand side, as viewed in Figure 2, and are adapted to discharge their contents at the right hand side when inverted, as will be subsequently explained. Located immediately inward of the buckets 33 and in close relation thereto, there is a disc or plate 34 mounted fixedly upon the shaft 16. This plate is formed with an interruption or opening 34 at one side, which in the present instance extends over a radius of 120 degrees, so that the spaces between the buckets are exposed to the interior of the screen 25 at this opening. A structural stationary plate or disc 36 is mounted on the shaft, having a hub portion 37 extended longitudinally therefrom to the upper boxing 15, to which it may be secured in any desired manner. This plate is set inwardly of the flange 32 before mentioned, which overlaps it a distance in close spaced relation, and at a high point on the plate 36, an opening is formed therethrough to which a conduit or duct 39 is extended, so as to discharge through the opening 38 the material to be classified and separated. At the inner side of the opening 38, a duct or passage 40 is fixed on the plate 36 and extended horizontally to the left as shown in Figure 2, so that it approaches very close to the path of the buckets 33. It is of a width to fit snugly between the plates 36 and 34, so that material admitted through the duct 39 and discharged from the passage 40 toward the buckets will escape in a minimum degree, except as it enters the buckets and the spaces between the buckets. Extending from the upper and lower sides of the passage 40 at its discharge end, there is a continuous cylindrical flange or plate 41, also fitted closely between the plates 36 and 34, and being attached integrally to the plate 36 by welding or otherwise, as found preferable. The plate 36 stops flush with the flange 41, which, as will be understood, is in very close relation to the inner edges of the buckets 33, and in effect forms a passage between itself and the outer rotating flange 33, in which passage material ejected from the passage 40 will pass downwardly with the buckets, and to or beyond the bottom side of the bucket ring, until the opening 35 is reached.

In the use of this device, the mud and contained aggregates to be separated, are introduced through the duct 39 in any approved manner, and is thereby fed through the passage 40 to the buckets 33 and passage 42. The weight of this material in the buckets and the passage 42 overbalances the opposite side of the bucket ring, and causes the loaded portion to descend, thus rotating the bucket ring and screen in a counterclockwise direction, as viewed in Figure 2. The speed of rotation may be regulated by the adjustment of the plate 34, as will be understood. Thus, if the opening 35 is located at a high point in the device, the loaded portion of the ring 30 will extend beyond a vertical line from the shaft, and upwardly on the right hand—or ascending—side of the ring, and thus correspondingly counterbalancing the material which is loaded on the descending side, so that, with the element of friction of the material itself and any material which may have been previously discharged into the screen 25, the rotation of the latter is retarded. On the other hand, with the opening 35 adjusted so that its lower side is approximately on a vertical radius of the shaft 16, a corresponding increase in efficiency of the rotation of the device is attained, by reduction of the counterbalancing load in the bucket ring.

As the loaded portion of the ring ascends beyond the lower edge of the opening 35, the material between the buckets falls outwardly and downwardly into the screen 25, and the buckets themselves similarly become emptied, and by reason of the inclination of the plane of the bucket wheel, the material therefrom falls clear of the lower portion of the bucket device and a short distance within the screen, as indicated in Figure 1. Here, the rotation of the screen causes the introduced material to be agitated by flowing and turning upon itself against the screen, so that freeing of the liquid or fluid portion from the coarser aggregate is facilitated, as will be understood. Continued increment of the mixture at the receiving end of the device pushes the previously introduced material toward the smaller end of the screen, so that with the additional tendency of the material to roll backwardly from the ascending side of the screen in a vertical plane, which adds further to the progression of the material longitudinally, the aggregate with a minimum of the matrix fluid finally reaches the left hand end of the screen, where it is lifted and allowed to drop into the chute 28, by which it may be conveyed to any suitable receiver, conveyor, or other facility or arrangement.

The liquid passes through the screen and accumulates in the pan 12 sufficiently to flow through the discharge or drain duct 11, or, if necessary, may be otherwise removed, in case it is of greater stiffness or consistency requiring mechanical propulsion or movement.

It will be understood that while we have illustrated and described a specific construction of device carrying into effect our invention, this is purely exemplary, and it will be understood that various modifications and proportions and form of the elements, and substitution of the equivalents may be made without departing from the spirit of the invention, as set forth in the appended claims.

It is a peculiar advantage of our invention that there is little if any tendency for the material within the screen to flow directly by gravity toward the discharge end of the screen, while at its lower part, and thereby a minimum of liquid or fluid will be removed by flow transmission longitudinally through the screen. The crowding or pushing of material longitudinally by the increment material falling from the buckets is manifest for only a short distance, and thereafter no material, if any, flow longitudinally of the screen occurs at the lower side. The progression of the material is principally by the slight diagonal movement which it attains with respect to the vertical at the ascending side of the screen, and when it falls back by gravity.

We claim:

1. A device of the character described consisting of a revolubly mounted substantially tubular sieve having its axis of rotation within the sieve, a coaxial ring device fixed with the sieve having a peripheral and an inwardly projected wall spaced from the sieve at the outer side, a plurality of bucket elements thereon open inwardly and the spaces therebetween being open longitudinally inward toward the sieve, a stationary cylindrical wall element close to the path of the bucket elements at the inner side, said inwardly projected wall being in close relation thereto, and a wall element longitudinally inward of and close to the path of the buckets to form a closure therefor next the sieve, and having an opening therethrough to permit emptying of the ring device and buckets therethrough into the sieve, and said wall being movable for adjustment of said opening along said path.

2. The structure of claim 1 in which said sieve is mounted for rotation on an axis inclined downwardly from said ring portion toward the opposite end.

3. The structure of claim 1 in which said screen is frusto conical with said ring at the larger end and mounted for rotation on an axis inclined downwardly from the larger end toward the smaller, whereby the lower side of the screen is positioned so as to reduce the tendency of liquids to flow directly in a longitudinal direction and whereby material passing said opening and moving relatively backward on the ascending side of the screen will move by gravity with a substantial longitudinal component.

LOUIS E. CRANE.
MACK HAGGARD.